(12) United States Patent
Zhamu et al.

(10) Patent No.: US 9,899,672 B2
(45) Date of Patent: *Feb. 20, 2018

(54) CHEMICAL-FREE PRODUCTION OF GRAPHENE-ENCAPSULATED ELECTRODE ACTIVE MATERIAL PARTICLES FOR BATTERY APPLICATIONS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/156,504

(22) Filed: May 17, 2016

(65) Prior Publication Data
US 2017/0338472 A1 Nov. 23, 2017

(51) Int. Cl.
H01M 10/052 (2010.01)
H01M 4/36 (2006.01)
H01M 10/0525 (2010.01)
H01M 4/62 (2006.01)
H01M 4/02 (2006.01)

(52) U.S. Cl.
CPC .......... *H01M 4/366* (2013.01); *H01M 4/625* (2013.01); *H01M 10/0525* (2013.01); *H01M 2004/027* (2013.01)

(58) Field of Classification Search
CPC ................. H01M 10/052; H01M 10/0525
See application file for complete search history.

(56) References Cited

U.S. PATENT DOCUMENTS

| 2,798,878 A | 7/1957 | Hummers |
| 6,872,330 B2 | 3/2005 | Mack et al. |

(Continued)

OTHER PUBLICATIONS

D. Wang, et al. "Self-Assembled TiO2-Graphene Hybrid Nanostructures for Enhanced Li-Ion Insertion." ACS Nano, 3 (2009) 907-914.

(Continued)

*Primary Examiner* — Olatunji Godo

(57) ABSTRACT

Provided is a simple, fast, scalable, and environmentally benign method of producing graphene-embraced or encapsulated particles of a battery electrode active material directly from a graphitic material, the method comprising: a) mixing graphitic material particles and multiple particles of a solid electrode active material to form a mixture in an impacting chamber of an energy impacting apparatus, wherein the graphitic material has never been intercalated, oxidized, or exfoliated and the chamber contains therein no previously produced graphene sheets and no ball-milling media; b) operating the energy impacting apparatus with a frequency and an intensity for a length of time sufficient for transferring graphene sheets from the graphitic material to surfaces of electrode active material particles to produce graphene-embraced electrode active material particles; and c) recovering the particles from the impacting chamber. Also provided is a mass of the graphene-embraced particles, electrode containing such particles, and battery containing this electrode.

32 Claims, 8 Drawing Sheets

(56) References Cited

U.S. PATENT DOCUMENTS

| | | |
|---|---|---|
| 7,071,258 B1 | 7/2006 | Jang |
| 7,745,047 B2 | 6/2010 | Zhamu et al. |
| 8,580,432 B2 | 11/2013 | Zhamu et al. |
| 8,936,874 B2 | 1/2015 | Shi et al. |
| 2005/0136330 A1 | 6/2005 | Mao et al. |
| 2012/0202112 A1 | 8/2012 | Yushin et al. |
| 2014/0255785 A1 | 9/2014 | Do et al. |
| 2017/0166722 A1* | 6/2017 | Zhamu ............... C08K 3/04 |

OTHER PUBLICATIONS

Y. Ding, et al. "Preparation of nano-structured LiFePO4/ graphene composites by co-precipitation method," Electrochemistry Communications 12 (2010) 10-13.

Bor Z. Jang and A Zhamu, "Processing of Nano Graphene Platelets (NGPs) and NGP Nanocomposites: A Review," J. Materials Sci. 43 (2008) 5092-5101.

Nilliam S. Hummers, Jr., et al., Preparation of Graphitic Oxide, Journal of the American Chemical Society, 1958, p. 1339.

Walt A. DeHeer, Claire Berger, Phillip N. First, "Patterned thin film graphite devices and method for making same" U.S. Pat. No. 7,327,000 B2 (Jun 12, 2003).

Yang et al. "Two-dimensional Graphene Nano-ribbons," J. Am. Chem. Soc. 130 (2008) 4216-17.

G. W. Anderson et al, J. Amer. Chem. Soc. 96, 1839 (1965).

PCT/US17/31697, International Search Report and Written Opinion dated Jul. 19, 2017, 8 pages.

\* cited by examiner

CHEMICAL-FREE PRODUCTION OF GRAPHENE-ENCAPSULATED ELECTRODE ACTIVE MATERIAL PARTICLES FOR BATTERY APPLICATIONS

FIELD OF THE INVENTION

The present invention relates generally to the field of lithium batteries and, in particular, to an environmentally benign and cost-effective method of producing graphene-protected electrode active materials for lithium batteries.

BACKGROUND

A Review on Anode Active Materials

The most commonly used anode materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective surface-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. they can no longer be the active element for charge transfer. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal such as Al, and "a" satisfies 0<a #5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_4Sn$ (993 mAh/g), $Li_3Cd$ (715 mAh/g), $Li_3Sb$ (660 mAh/g), $Li_{44}Pb$ (569 mAh/g), LiZn (410 mAh/g), and $Li_3Bi$ (385 mAh/g). However, in the anodes composed of these materials, severe pulverization (fragmentation of the alloy particles) occurs during the charge and discharge cycles due to expansion and contraction of the anode active material induced by the insertion and extraction of the lithium ions in and out of the anode active material. The expansion and contraction, and the resulting pulverization of active material particles lead to loss of contacts between active particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been proposed:
(1) reducing the size of the active material particle, presumably for the purpose of reducing the strain energy that can be stored in a particle, which is a driving force for crack formation in the particle. However, a reduced particle size implies a higher surface area available for potentially reacting with the liquid electrolyte. Such a reaction is undesirable since it is a source of irreversible capacity loss.
(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.
(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of anode active particles are Si, Sn, and $SnO_2$. Unfortunately, when an active material particle, such as Si particle, expands during the battery charge step, the protective coating is easily broken due to the mechanical weakness and/or brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials alone are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion conductive. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or can be charged-discharged for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such a material in large quantities.

In response to these needs, one of our earlier applications discloses a nano-scaled graphene platelet-based composite composition for use as a lithium ion battery anode [A. Zhamu and B. Z. Jang, "Nano Graphene Platelet-Based Composite Anode Compositions for Lithium Ion Batteries," U.S. patent application Ser. No. 11/982,672 (Nov. 5, 2007); Now U.S. Pat. No. 7,745,047 (Jun. 29, 2010)]. This composition comprises: (a) micron- or nanometer-scaled particles or coating of an anode active material; and (b) a plurality of nano-scaled graphene platelets (NGPs), wherein a platelet comprises a graphene sheet or a stack of graphene sheets having a platelet thickness less than 100 nm and wherein the particles or coating are physically attached or chemically bonded to NGPs. Nano graphene platelets (NGPs) are individual graphene sheets (individual basal planes of carbon atoms isolated from a graphite crystal) or stacks of multiple graphene planes bonded together in the thickness direction. The NGPs have a thickness less than 100 nm and a length, width, or diameter that can be greater or less than 10 μm. The thickness is more preferably less than 10 nm and most preferably less than 1 nm.

Disclosed in another patent application of ours is a more specific composition, which is composed of a 3-D network of NGPs and/or other conductive filaments and select anode active material particles that are bonded to these NGPs or filaments through a conductive binder [Jinjun Shi, Aruna Zhamu and Bor Z. Jang, "Conductive Nanocomposite-based Electrodes for Lithium Batteries," U.S. patent application Ser. No. 12/156,644 (Jun. 4, 2008)]. Yet another application, as schematically shown in FIGS. 2(A) and 2(B), provides a nano graphene-reinforced nanocomposite solid particle composition containing NGPs and electrode active material particles, which are both dispersed in a protective matrix (e.g. a carbon matrix) [Aruna Zhamu, Bor Z. Jang, and Jinjun Shi, "Nano Graphene Reinforced Nanocomposite for Lithium Battery Electrodes," U.S. patent application Ser. No. 12/315,555 (Dec. 4, 2008)].

After our discovery of graphene providing an outstanding support for anode active materials, many subsequent studies by others have confirmed the effectiveness of this approach. For instance, Wang, et al. investigated self-assembled $TiO_2$-graphene hybrid nanostructures for enhanced Li-ion insertion [D. Wang, et al. "Self-Assembled $TiO_2$-Graphene Hybrid Nanostructures for Enhanced Li-Ion Insertion." *ACS Nano*, 3 (2009) 907-914]. The results indicate that, as compared with the pure $TiO_2$ phase, the specific capacity of the hybrid was more than doubled at high charge rates. The improved capacity at a high charge-discharge rate was attributed to increased electrode conductivity afforded by a percolated graphene network embedded into the metal oxide electrodes. However, all these earlier studies were focused solely on providing a network of electron-conducting paths for the anode active material particles and failed to address other critical issues, such as ease of anode material processing, electrode processability, electrode tap density (the ability to pack a dense mass into a given volume), and long-term cycling stability. For instance, the method of preparing self-assembled hybrid nanostructures is not amenable to mass production. The graphene oxide sheets used were made using an environmentally undesirable process prior to the assembling procedure. The anode material particle-coated graphene sheets alone are not suitable for electrode fabrication (due to the difficulty in coating the materials onto a current collector), and the resulting electrodes are typically too low in the tap density. Additionally, paper-based composite structures are not compatible with current lithium-ion battery production equipment. These are all critically important issues that must be addressed in a real battery manufacturing environment.

A Review on Cathode Active Materials

Due to extremely poor electrical conductivity of all cathode (positive electrode) active materials in a lithium-ion, lithium metal, or lithium-sulfur cell, a conductive additive (e.g. carbon black, fine graphite particles, expanded graphite particles, or their combinations), typically in the amount of 5%-20%, must be added into the electrode. In the case of a lithium-sulfur cell, a carbon amount as high as 50% by weight is used as a conductive support for sulfur in the cathode. However, the conductive additive is not an electrode active material (i.e. it is not capable of reversibly storing lithium ions). The use of a non-active material means that the relative proportion of an electrode active material, such as $LiFePO_4$, is reduced or diluted. For instance, the incorporation of 5% by weight of PVDF as a binder and 5% of carbon black as a conductive additive in a cathode would mean that the maximum amount of the cathode active material (e.g., lithium cobalt oxide) is only 90%, effectively reducing the total lithium ion storage capacity. Since the specific capacities of the more commonly used cathode active materials are already very low (140-170 mAh/g), this problem is further aggravated if a significant amount of non-active materials is used to dilute the concentration of the active material.

State-of-the-art carbon black (CB) materials, as a conductive additive, have several drawbacks:

(1) CBs are typically available in the form of aggregates of multiple primary particles that are typically spherical in shape. Due to this geometric feature (largest dimension-to-smallest dimension ratio or aspect ratio~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths.

(2) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for a more effective electrically conductive additive material. Preferably, this electrically conductive additive is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

There have been several attempts to use other carbon nano-materials than carbon black (CB) or acetylene black (AB) as a conductive additive for the cathode of a lithium battery. These include carbon nano-tubes (CNTs), vapor-grown carbon nano-fibers (VG-CNFs), and simple carbon coating on the surface of cathode active material particles. The result has not been satisfactory and hence, as of today, carbon black and artificial graphite particles are practically the only two types of cathode conductive additives widely used in lithium ion battery industry. The reasons are beyond just the obvious high costs of both CNTs and VG-CNFs. The difficulty in disentangling CNTs and VG-CNFs and uniformly dispersing them in a liquid or solid medium has been an impediment to the more widespread utilization of these expensive materials as a conductive additive. Additionally, the production of both CNTs and VG-CNFs normally require the use of a significant amount of transition metal nano particles as a catalyst. It is difficult to remove and impossible to totally remove these transition metal particles, which can have adverse effect on the cycling stability of a lithium metal.

As for the less expensive carbon coating, being considered for use in lithium iron phosphate, the conductivity of the carbon coating (typically obtained by converting a precursor such as sugar or resin via pyrolyzation) is relatively low. It would take a graphitization treatment to render the carbon coating more conductive, but this treatment requires a temperature higher than 2,000° C., which would degrade the underlying cathode active material (e.g., $LiFePO_4$).

As an alternative approach, Ding, et al investigated the electrochemical behavior of $LiFePO_4$/graphene composites [Y. Ding, et al. "Preparation of nano-structured $LiFePO_4$/graphene composites by co-precipitation method," Electrochemistry Communications 12 (2010) 10-13]. The co-precipitation method leads to the formation of $LiFePO_4$ nano-particles coated on both primary surfaces of graphene nano-sheets. The cathode is then prepared by stacking these $LiFePO_4$-coated graphene sheets together. This approach has several major drawbacks:

(1) With the two primary surfaces of a graphene sheet attached with $LiFePO_4$ nano-particles, the resulting electrode entails many insulator-to-insulator contacts between two adjoining coated sheets in a stack.

(2) Only less than 30% of the graphene surface area is covered by $LiFePO_4$ particles on either side. This is a relatively low proportion of the cathode active material.

(3) The $LiFePO_4$ particles are easily detached from graphene sheets during handling and electrode production.

(4) We have found that the nano particle-attached graphene sheets as prepared by the co-precipitation method are not amenable to fabrication of cathodes with current electrode coating equipment. In particular, these particle-attached graphene sheets could not be compacted into a dense state with a high mass per unit electrode volume. In other words, the cathode tap density is relatively low. This is a very serious issue since all of the commonly used cathode active materials, including $LiFePO_4$, already have a very low specific capacity (mAh/g), and not being able to pack a large mass of a cathode active material into a given electrode volume would mean an excessively low overall capacity at the cathode side. (It may be noted that the typical specific capacity (140-170 mAh/g) of a cathode active material is already much lower than that (330-360 mAh/g) of an anode active material. Such an imbalance has been a major issue in the design and fabrication of lithium ion batteries.)

A Review on Graphene (Isolated Graphene Sheets or Nano Graphene Platelets)

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene 5% by weight of oxygen), graphene oxide (≥5% by weight of oxygen), slightly fluorinated graphene 5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Prior Art Method for Production of Isolated Graphene Sheets (NGPs)

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Thus, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

Using the lithium-ion battery and lithium metal battery as examples, these graphene sheets must be effective in (a) protecting anode active materials or cathode active materials (e.g. against volume expansion/shrinkage-induced pulverization) and the electrodes (against excessive volume changes of both anode and cathode) during repeated battery charges/discharges for improved cycle stability and (b) providing a 3D network of electron-conducting pathways without the use of an excessive amount of conductive additives that are non-active materials (those that add weight and volume to the battery without providing additional capacity of storing lithium ions).

Most desirably, a need exists for a process that is capable of producing isolated graphene sheets directly from a graphitic material and, concurrently, transferring the graphene sheets to wrap around or embrace the particles of an anode active material or cathode active material.

In short, the present invention was made to overcome the aforementioned limitations of current lithium batteries and the graphene materials used to protect these batteries.

SUMMARY OF THE INVENTION

The present invention provides a strikingly simple, fast, scalable, environmentally benign, and cost-effective method of producing graphene-embraced (graphene-encapsulated) electrode active material (either an anode active material or a cathode active material) for a wide variety of batteries. This method meets the aforementioned needs. This method entails producing single-layer or few layer graphene sheets directly from a graphitic or carbonaceous material (a graphene source material) and immediately transferring these isolated (peeled-off) graphene sheets onto surfaces of electrode active material particles to form graphene-embraced or graphene-encapsulated electrode active material particles. In an embodiment, the graphitic material or carbonaceous material has never been intercalated, oxidized, or exfoliated and does not include previously produced isolated graphene sheets.

Specifically, this invention provides a self-embracing or self-encapsulating method of producing a graphene-embraced or graphene-encapsulated electrode active material directly from a graphitic material. In an embodiment, the method comprises:

a) mixing multiple particles of a graphitic material and multiple particles of a solid electrode active material to form a mixture in an impacting chamber of an energy impacting apparatus, wherein the graphitic material has never been intercalated, oxidized, or exfoliated and does not include previously produced isolated graphene sheets and the impacting chamber contains no ball-milling media (i.e., the solid electrode active material particles themselves serve as an impacting media and no externally added ball-milling media is needed or involved);

b) operating the energy impacting apparatus with a frequency and an intensity for a length of time sufficient for transferring graphene sheets from the particles of graphitic material to surfaces of the solid electrode active material particles to produce a graphene-embraced electrode active material inside the impacting chamber (i.e., solid electrode active material particles impinge upon surfaces of graphitic material particles, peeling off graphene sheets therefrom, and naturally allowing the peeled-off graphene sheets to fully wrap around or embrace the solid electrode active material particles); and c) recovering the particles of graphene-embraced electrode active material from the impacting chamber (this can be as simple as removing the cap to the impacting chamber and removing the particles of graphene-embraced electrode active material).

The method further comprises a step of incorporating the graphene-embraced or graphene-encapsulated electrode active material into a battery electrode.

There can be some particles of graphitic material that are not fully utilized (i.e., not all graphene sheets have been peeled off) after step b). Hence, in an embodiment, an amount of residual graphitic material remains after step b) and the method further comprises a step of incorporating the graphene-embraced electrode active material and the residual graphitic material into a battery electrode. The residual graphitic material can serve as a conductive filler in the battery electrode.

In another embodiment, an amount of residual graphitic material remains after step b), and step c) includes a step of partially or completely separating the residual amount of graphitic material from the graphene-embraced electrode active material.

In some embodiments, the particles of solid electrode active material contain pre-lithiated or pre-sodiated particles. In other words, before the electrode active material particles (such as Si or $SnO_2$) are embraced by graphene sheets, these particles have been previously intercalated with Li or Na ions (e.g. via electrochemical charging) up to an amount of 0.1% to 30% by weight of Li or Na. This is a highly innovative and unique approach for the following considerations. The intercalation of these particles with Li or Na has allowed the Si or $SnO_2$ particles to expand to a large volume (potentially up to 380% of its original volume). If these pre-lithiated or pre-sodiated particles are then wrapped around or embraced by graphene sheets and incorporated into an electrode (i.e. anode containing graphene-embraced particles of Si or $SnO_2$), the electrode would no longer have any issues of electrode expansion and expansion-induced failure during subsequent charge-discharge cycles of the lithium- or sodium-ion battery. In other words, the Si or $SnO_2$ particles have been provided with expansion space between these particles and the embracing graphene sheets. Our experimental data have surprisingly shown that this strategy leads to significantly longer battery cycle life and more efficient utilization of the electrode active material capacity.

In some embodiments, prior to the instant "graphene direct transfer and embracing process," the particles of solid electrode active material contain particles pre-coated with a coating layer of a conductive material selected from carbon, pitch, carbonized resin, a conductive polymer, a conductive organic material, a metal coating, a metal oxide shell, or a combination thereof. The coating layer thickness is preferably in the range from 1 nm to 20 μm, preferably from 10 nm to 10 μm, and further preferably from 100 nm to 1 μm.

In some embodiments, the particles of solid electrode active material contain particles that are pre-coated with a carbon precursor material selected from a coal tar pitch, petroleum pitch, meso-phase pitch, polymer, organic material, or a combination thereof so that the carbon precursor material resides between surfaces of the solid electrode active material particles and the graphene sheets, and the method further contains a step of heat-treating the graphene-embraced electrode active material to convert the carbon precursor material to a carbon material and pores, wherein the pores form empty spaces between surfaces of the solid electrode active material particles and the graphene sheets, and the carbon material is coated on the surfaces of solid electrode active material particles and/or chemically bonds the graphene sheets together.

In some embodiments, the particles of solid electrode active material contain particles pre-coated with a sacrificial material selected from a metal, pitch, polymer, organic material, or a combination thereof in such a manner that the sacrificial material resides between surfaces of particles of solid electrode active material and the graphene sheets, and the method further contains a step of partially or completely removing the sacrificial material to form empty spaces between surfaces of the solid electrode active material particles and the graphene sheets.

In some embodiments, the method further comprises a step of exposing the graphene-embraced electrode active material to a liquid or vapor of a conductive material that is conductive to electrons and/or ions of lithium, sodium, magnesium, aluminum, or zinc.

The particles of electrode active material may be an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

The electrode active material may be a cathode active material selected from an inorganic material, an organic or polymeric material, a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

In some embodiments, the electrode active material may be a cathode active material selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof.

The metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof. These compounds are preferably mixed with a conducting material to improve their electrical conductivity and rigidity so as to enable the peeling-off of graphene sheets from the graphitic material particles.

The thioether polymer in the above list may be selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTH-BDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

In some embodiments, the electrode active material particles include powder, flakes, beads, pellets, spheres, wires, fibers, filaments, discs, ribbons, or rods, having a diameter or thickness from 10 nm to 20 μm. Preferably, the diameter or thickness is from 1 μm to 100 μm.

In the invented method, the graphitic material may be selected from natural graphite, synthetic graphite, highly oriented pyrolytic graphite, graphite fiber, graphitic nanofiber, graphite fluoride, chemically modified graphite, mesocarbon micro-bead, partially crystalline graphite, or a combination thereof.

The method energy impacting apparatus may be a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device In the graphene-embraced electrode active material particles, the graphene sheets contain single-layer graphene sheets. In some embodiments, the graphene sheets contain at least 80% single-layer graphene or at least 80% few-layer graphene having no greater than 10 graphene planes.

The impacting chamber may further contain a functionalizing agent and step (b) of operating the energy impacting apparatus acts to chemically functionalize said graphene sheets with said functionalizing agent. The functionalizing agent may contain a chemical functional group selected from alkyl or aryl silane, alkyl or aralkyl group, hydroxyl group, carboxyl group, amine group, sulfonate group ($-SO_3H$), aldehydic group, quinoidal, fluorocarbon, or a combination thereof.

In some embodiments, the functionalizing agent contains an oxygenated group selected from the group consisting of hydroxyl, peroxide, ether, keto, and aldehyde. In some embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_3$-y, $Si(-O-SiR'_2-)OR'$, R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The functionalizing agent may contain a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R)_3X^-$, $R'SiR'_3$, $R'Si(-OR'-)_yR'_{3-y}$, $R'Si(-O-SiR'_2-)OR'$, R'—R", R'—N—CO, $(C_2H_4O-)_wH$, $(-C_3H_6O-)_wH$, $(-C_2H_4O)_w$—R', $(C_3H_6O)_w$—R', R', and w is an integer greater than one and less than 200.

The present invention also provides a mass of graphene-embraced particles of solid active material produced by the aforementioned method, wherein the graphene proportion is from 0.01% to 20% by weight based on the total weight of graphene and solid active material particles combined.

Also provided is a battery electrode containing the graphene-embraced electrode active material produced according to the presently invented method, and a battery containing such an electrode. The battery electrode containing the graphene-embraced electrode active material may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, or zinc-air battery.

It may be noted that the graphene production step per se (peeling off graphene sheets directly from graphite particles and immediately or concurrently transferring these graphene sheets to electrode active material particle surfaces) is quite surprising, considering the fact that prior researchers and manufacturers have focused on more complex, time intensive and costly methods to create graphene in industrial quantities. In other words, it has been generally believed that chemical intercalation and oxidation is needed to produce bulk quantities of isolated graphene sheets (NGPs). The present invention defies this expectation in many ways:

1. Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of electrode active material particles. No undesirable chemicals (e.g. sulfuric acid and nitric acid) are used.
2. Unlike oxidation and intercalation, pristine graphene sheets can be transferred onto the electrode active material. The sheets being free of oxidation damage allow the creation of graphene-encapsulated particle products with higher electrical and thermal conductivity.
3. Contrary to common production methods, a washing process requiring substantial amounts of water or solvent is not needed
4. Unlike bottom up production methods capable of producing small graphene sheets, large graphene sheets can be produced with the instant method.
5. Unlike CVD and solution-based metalorganic production methods, elevated temperatures are not required to reduce graphene oxide to graphene and metalorganic compounds to pure metal. This greatly reduces the opportunity for undesirable diffusion of carbon into the electrode active material.
6. Unlike CVD and solution-based metalorganic production methods, this process is amenable to almost any electrode active material. The electrode active material does not need to be a compatible "template" or catalyst, as is required for the CVD process.
7. This direct transfer process does not require the use of externally added ball milling media (such as zirconia beads or plastic beads). The electrode active material particles themselves are the graphene-peeling media. The presence of extra milling media often leads to an excessively thick graphene shell, thereby reducing the amount of active material and overall energy density per unit weight of a battery shell. These observations are significant and unexpected.
8. This method allows the creation of continuous, interpenetrating three dimensional networks of graphene sheets.
9. The present invention is amenable to industrial scale production in a continuous energy impact device.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

One preferred specific embodiment of the present invention is a method of peeling off graphene planes of carbon atoms (1-10 planes of atoms that are single-layer or few-layer graphene sheets) that are directly transferred to surfaces of electrode active material particles. A graphene sheet or nano graphene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene and some few-layer graphene sheets (<5 layers). The length and width of a NGP are typically between 200 nm and 20 μm, but could be longer or shorter, depending upon the sizes of source graphite material particles.

The present invention provides a strikingly simple, fast, scalable, environmentally benign, and cost-effective process that avoids essentially all of the drawbacks associated with prior art processes of producing graphene sheets and obviates the need to execute a separate (additional) process to combine the produced graphene sheets and particles of an electrode active material together to form a composite or hybrid electrode active material.

Figure 2:
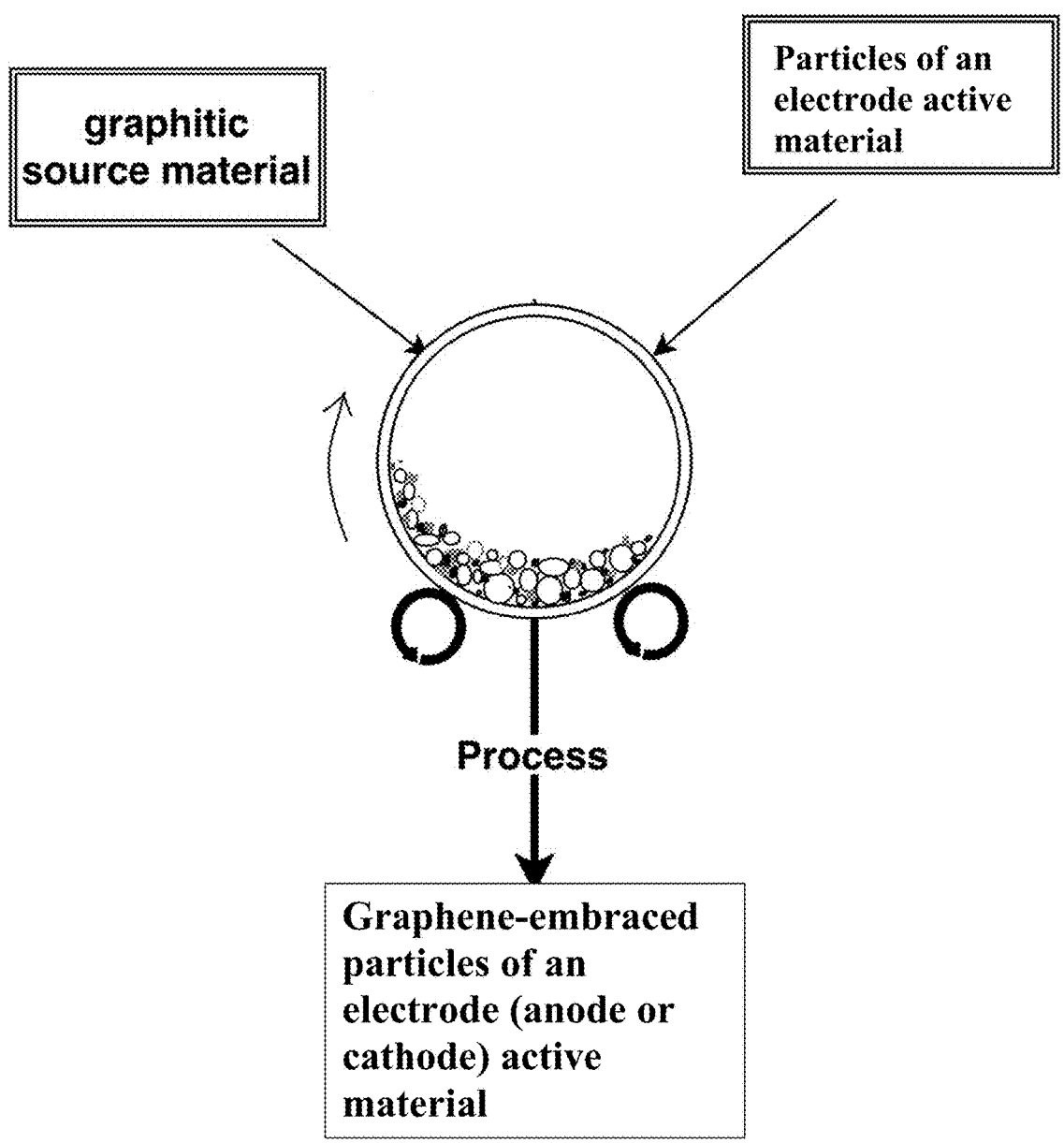
FIG. 2 A diagram showing the presently invented process for producing graphene-embraced or graphene-encapsulated electrode active material particles via an energy impacting apparatus.

As schematically illustrated in FIG. 2, one preferred embodiment of this method entails placing particles of a source graphitic material and particles of a solid electrode active material (without any externally added impacting balls, such as ball-milling media) in an impacting chamber. After loading, the resulting mixture is exposed to impacting energy, which is accomplished, for instance, by rotating the chamber to enable the impacting of the active material particles against graphite particles. These repeated impacting events (occurring in high frequencies and high intensity) act to peel off graphene sheets from the surfaces of graphitic material particles and, immediately and directly, transfer these graphene sheets to the surfaces of the active material particles to form graphene-embraced active material particles. Typically, the entire particle is covered by graphene sheets (fully wrapped around, embraced or encapsulated). This is herein referred to as the "direct transfer" process.

Alternatively but less desirably, impacting balls (e.g. stainless steel or zirconia beads) may be added into the impacting chambers and, as such, graphene sheets may also be peeled off by the impacting balls and tentatively transferred to the surfaces of these impacting balls first. When the graphene-coated impacting balls subsequently impinge upon the solid electrode active material particles, the graphene sheets are transferred to surfaces of the electrode active material particles to form graphene-coated active material particles. This is an "indirect transfer" process. A major drawback of such an indirect transfer process is the need to separate the externally added impacting balls (e.g. ball-milling media) from the graphene-embraced particles. This is not always possible or economically feasible, however.

In less than two hours (often less than 1 hour) of operating the direct transfer process, most of the constituent graphene sheets of source graphite particles are peeled off, forming mostly single-layer graphene and few-layer graphene (mostly less than 5 layers or 5 graphene planes). Following the direct transfer process (graphene sheets wrapped around active material particles), the residual graphite particles (if present) are separated from the graphene-embraced (graphene-encapsulated) particles using a broad array of methods. Separation or classification of graphene-embraced (graphene-encapsulated) particles from residual graphite particles (if any) can be readily accomplished based on their differences in weight or density, particle sizes, magnetic properties, etc. The resulting graphene-embraced particles are already a two-component material; i.e. they are already "mixed" and there is no need to have a separate process of mixing isolated graphene sheets with electrode active material particles.

In other words, production of graphene sheets and mixing of graphene sheets with an electrode active material are essentially accomplished concurrently in one operation. This is in stark contrast to the traditional processes of producing graphene sheets first and then subsequently mixing the graphene sheets with an active material. Traditional dry mixing typically does not result in homogeneous mixing or dispersion of two or multiple components. It is also challenging to properly disperse nano materials in a solvent to form a battery slurry mass for coating on a current collector.

Figure 1:
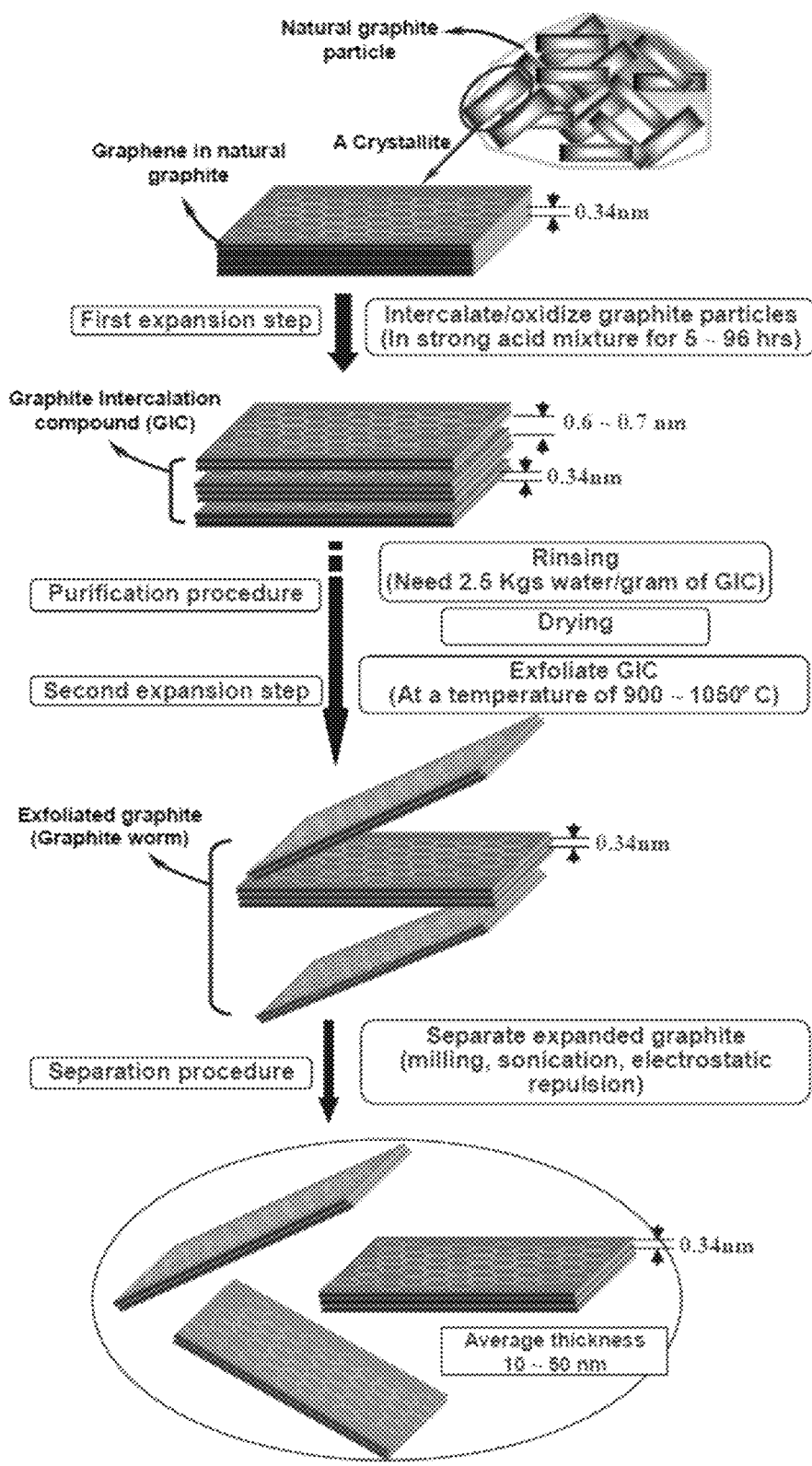
FIG. 1 A flow chart showing the most commonly used prior art process of producing highly oxidized graphene sheets (or nano graphene platelets, NGPs) that entails tedious chemical oxidation/intercalation, rinsing, and high-temperature exfoliation procedures.

As shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range of 1,500-4,500 S/cm. In contrast, the RGO paper prepared by the same paper-making procedure typically exhibits electrical conductivity values in the range of 100-1,000 S/cm.

In the most common implementation of ball mill mixing, previously produced graphene sheets or platelets are added to electrode active material powders. Impact energy is applied via ball mill for a period of time to disperse graphene platelets or sheets in the powder. This is often carried out in a liquid (solvent) solution. The disadvantages of this graphene/active material mixing process are obvious—graphene is a costly input material, solvent recovery is required, and most significantly, the graphene input into the process has been damaged by oxidation during prior processing. This reduces desirable end properties, such as thermal conductivity and electrical conductivity.

Another prior art process is coating of CVD onto metal nano particles. This is the most limited of all prior art methods, being possible only on certain metals that are suitable catalysts for facilitating decomposition of hydrocarbon gas to form carbon atoms and as templates for graphene to grow on. As a "bottom up" graphene production method, it requires costly capital equipment and costly input materials.

In all these prior art processes for producing graphene-coated electrode active material particles, isolated graphene sheets and particles of the active material are dispersed in a solvent (e.g. NMP) to form a slurry. The slurry is then dried (e.g. using spray drying) to form graphene-active material composite particles. These composites do not necessarily have the morphology or structure of active material particles being fully wrapped around or embraced.

In contrast, the presently invented impacting process entails combining graphene production, functionalization (if desired), and mixing of graphene with electrode active material particles in a single operation. This fast and environmentally benign process not only avoids significant chemical usage, but also produces embracing graphene sheets of higher quality—pristine graphene as opposed to thermally reduced graphene oxide produced by the prior art process. Pristine graphene enables the creation of embraced particles with higher electrical and thermal conductivity.

Although the mechanisms remain incompletely understood, this revolutionary process of the present invention has essentially eliminated the conventionally required functions of graphene plane expansion, intercalant penetration, exfoliation, and separation of graphene sheets and replace it with a single, entirely mechanical exfoliation process. The whole process can take less than 2 hours (typically 10 minutes to 1 hour), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. The particle size of graphite can be smaller than, comparable to, or larger than the particle size of the electrode active material. The graphitic material may be selected from natural graphite, synthetic graphite, highly oriented pyrolytic graphite, mesocarbon micro-bead, graphite fiber, graphitic nano-fiber, graphite oxide, graphite fluoride, chemically modified graphite, exfoliated graphite, or a combination thereof. It may be noted that the graphitic material used for the prior art chemical production and reduction of graphene oxide requires size reduction to 75 um or less in average particle size. This process requires size reduction equipment (for example hammer mills or screening mills), energy input, and dust mitigation. By contrast, the energy impacting device method can accept almost any size of graphitic material. A starting graphitic material of several mm or cm in size or larger or a starting material as small as nano-scaled has been successfully processed to create graphene-coated or graphene-embedded particles of cathode or anode active materials. The only size limitation is the chamber capacity of the energy impacting device; but this chamber can be very large (industry-scaled).

The presently invented process is capable of producing single-layer graphene sheets that completely wrap around the particles of an electrode active material. In many examples, the graphene sheets produced contain at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content of no less than 95% by weight, or functionalized graphene.

The presently invented process does not involve the production of GIC and, hence, does not require the exfoliation of GIC at a high exfoliation temperature (e.g. 800-1, 100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

Figure 3:
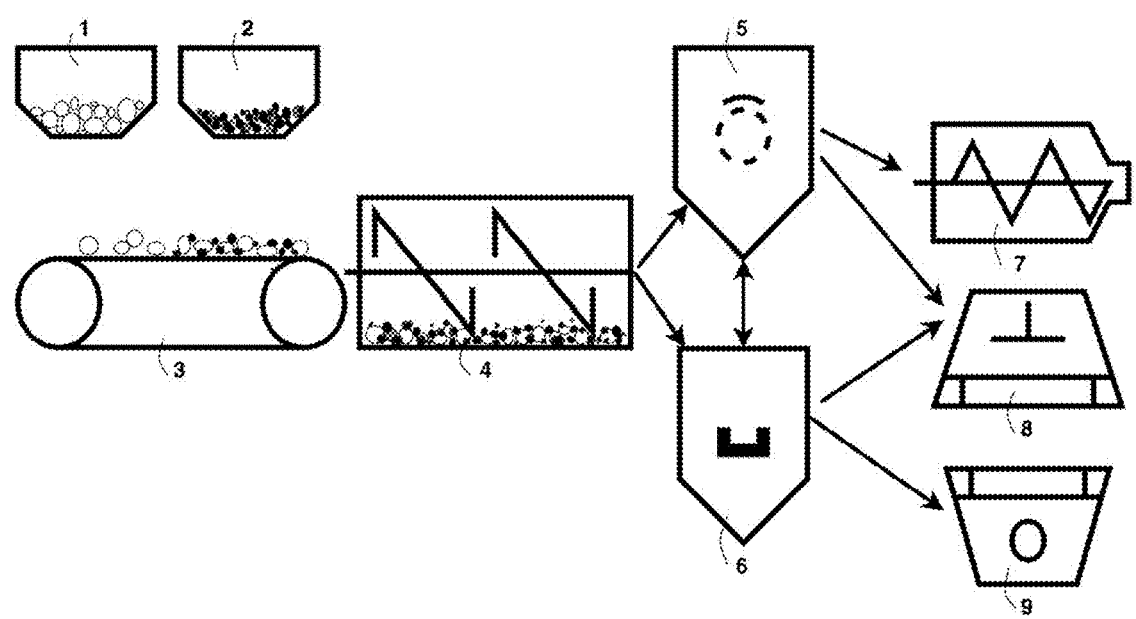
FIG. 3 A diagram showing the presently invented process for producing graphene-embraced electrode active material particles via a continuous ball mill.

In a desired embodiment, the presently invented method is carried out in an automated and/or continuous manner. For instance, as illustrated in FIG. 3, the mixture of graphite particles 1 and electrode active material particles 2 is delivered by a conveyer belt 3 and fed into a continuous ball mill 4. After ball milling to form graphene-embraced particles, the product mixture (possibly also containing some residual graphite particles) is discharged from the ball mill apparatus 4 into a screening device (e.g. a rotary drum 5) to separate graphene-embraced particles from residual graphite particles (if any). This separation operation may be assisted by a magnetic separator 6 if the electrode active material is ferromagnetic (e.g. containing Fe, Co, Ni, or Mn-based metal in some desired electronic configuration). The graphene-embraced particles may be delivered into a powder classifier, a cyclone, and or an electrostatic separator. The particles may be further processed, if so desired, by melting 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

The electrode active materials that are placed into the impacting chamber can be an anode active material or a cathode active material. For the anode active materials, those materials capable of storing lithium ions greater than 372 mAh/g (theoretical capacity of natural graphite) are particularly desirable. Examples of these high-capacity anode active materials are Si, Ge, Sn, $SnO_2$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, $SnO_2$, $Co_3O_4$, etc. quickly leads to pulverization of these particles and rapid capacity decay of the electrode.

Thus, for the purpose of addressing these problems, the particles of solid electrode active material may contain pre-lithiated or pre-sodiated particles. In other words, before the electrode active material particles (such as Si, Ge, Sn, $SnO_2$, $Co_3O_4$, etc.) are embraced by graphene sheets, these particles have already been previously intercalated with Li or Na ions (e.g. via electrochemical charging). This is a highly innovative and unique approach based on the following considerations. The intercalation of these particles with Li or Na would allow these particles to expand to a large volume or to its full capacity (potentially up to 380% of its original volume). If these pre-lithiated or pre-sodiated particles are then wrapped around or fully embraced by graphene sheets and incorporated into an electrode (e.g. anode containing graphene-embraced Si or $SnO_2$ particles), the electrode would no longer have any issues of electrode expansion and expansion-induced failure during subsequent charge-discharge cycles of the lithium- or sodium-ion battery. In other words, the Si or $SnO_2$ particles have been expanded to their maximum volume (during battery charging) and they can only shrink (during subsequent battery discharge). These contracted particles have been previously provided with expansion space between these particles and the embracing graphene sheets. Our experimental data have shown that this strategy surprisingly leads to significantly longer battery cycle life and better utilization of the electrode active material capacity.

In some embodiments, prior to the instant graphene production, direct transfer and embracing process, the particles of solid electrode active material contain particles that are pre-coated with a coating of a conductive material selected from carbon, pitch, carbonized resin, a conductive polymer, a conductive organic material, a metal coating, a metal oxide shell, or a combination thereof. The coating layer thickness is preferably in the range from 1 nm to 10 μm, preferably from 10 nm to 1 μm, and further preferably from 20 nm to 200 nm. This coating is implemented for the purpose of establishing a solid-electrolyte interface (SEI) to increase the useful cycle life of a lithium-ion or sodium-ion battery.

In some embodiments, the particles of solid electrode active material contain particles that are pre-coated with a carbon precursor material selected from a coal tar pitch, petroleum pitch, meso-phase pitch, polymer, organic material, or a combination thereof so that the carbon precursor material resides between surfaces of the solid electrode active material particles and the graphene sheets, and the method further contains a step of heat-treating the graphene-embraced electrode active material to convert the carbon precursor material to a carbon material and pores, wherein the pores form empty spaces between surfaces of the solid electrode active material particles and the graphene sheets and the carbon material is coated on the surfaces of solid electrode active material particles and/or chemically bonds the graphene sheets together. The carbon material helps to completely seal off the embracing graphene sheets to prevent direct contact of the embraced anode active material with liquid electrolyte, which otherwise continues to form additional SEI via continuously consuming the lithium ions or solvent in the electrolyte, leading to rapid capacity decay.

In some embodiments, the particles of solid electrode active material contain particles pre-coated with a sacrificial material selected from a metal, pitch, polymer, organic material, or a combination thereof in such a manner that the sacrificial material resides between surfaces of solid electrode active material particles and the graphene sheets, and the method further contains a step of partially or completely removing the sacrificial material to form empty spaces between surfaces of the solid electrode active material particles and the graphene sheets. The empty spaces can accommodate the expansion of embraced active material particles without breaking the embraced particles.

In some embodiments, the method further comprises a step of exposing the graphene-embraced electrode active material to a liquid or vapor of a conductive material that is conductive to electrons and/or ions of lithium, sodium, magnesium, aluminum, or zinc. This procedure serves to provide a stable SEI or to make the SEI more stable.

The particles of electrode active material may be an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof. Both sodiated and un-sodiated versions of the materials in the above list are also anode active materials for sodium-ion batteries.

The electrode active material may be a cathode active material selected from an inorganic material, an organic material, an intrinsically conducting polymer (known to be capable of string lithium ions), a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

In some embodiments, the electrode active material may be a cathode active material selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof. This group of materials is particularly suitable for use as a cathode active material of a lithium metal battery.

The metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([$(NPS_2)_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof. These compounds are preferably mixed with a conducting material to improve their electrical conductivity, rigidity and strength so as to enable the peeling-off of graphene sheets from the graphitic material particles.

The thioether polymer in the above list may be selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTH-BDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

In some embodiments, the electrode active material particles include powder, flakes, beads, pellets, spheres, wires, fibers, filaments, discs, ribbons, or rods, having a diameter or thickness from 10 nm to 20 µm. Preferably, the diameter or thickness is from 1 µm to 100 µm.

In the invented method, the graphitic material may be selected from natural graphite, synthetic graphite, highly oriented pyrolytic graphite, graphite fiber, graphitic nanofiber, graphite fluoride, chemically modified graphite, mesocarbon micro-bead, partially crystalline graphite, or a combination thereof.

The energy impacting apparatus may be a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device Graphene sheets transferred to electrode active material surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nano platelets produced through transfer to a solid carrier particle. The impact-induced kinetic energy is of sufficient energy and intensity to chemically activate the edges and even surfaces of graphene sheets embraced around active material particles (e.g. creating highly active sites or free radicals). Provided that certain chemical species containing desired chemical function groups (e.g. OH—, —COOH, —$NH_2$, Br—, etc.) are included in the impacting chamber, these functional groups can be imparted to graphene edges and/or surfaces. In other words, production and chemical functionalization of graphene sheets can be accomplished concurrently by including appropriate chemical compounds in the impacting chamber. In summary, a major advantage of the present invention over other processes is the simplicity of simultaneous production and modification of graphene surface chemistry for improved battery performance.

Graphene platelets derived by this process may be functionalized through the inclusion of various chemical species in the impacting chamber. In each group of chemical species discussed below, we selected 2 or 3 chemical species for functionalization studies.

In one preferred group of chemical agents, the resulting functionalized NGP may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—OR'—$)_yR'_{3-y}$, Si(—O—$SiR'_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Graphene-embraced electrode active material particles may be used to improve the mechanical properties, electrical conductivity and thermal conductivity of an electrode. For enhanced lithium-capturing and storing capability, the functional group —$NH_2$ and —OH are of particular interest. For example, diethylenetriamine (DETA) has three —$NH_2$ groups. If DETA is included in the impacting chamber, one of the three —$NH_2$ groups may be bonded to the edge or surface of a graphene sheet and the remaining two un-reacted —$NH_2$ groups will be available for reversibly capturing a lithium or sodium atom and forming a redox pair therewith. Such an arrangement provides an additional mechanism for storing lithium or sodium ions in a battery electrode.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin material at one or two other ends.

The above-described [NGP]—$R_m$ may be further functionalized. This can be conducted by opening up the lid of an impacting chamber after the —$R_m$ groups have been attached to graphene sheets and then adding the new functionalizing agents to the impacting chamber and resuming the impacting operation. The resulting graphene sheets or platelets include compositions of the formula: [NGP]-$A_m$ where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$(R)$_3$X$^-$, $R'SiR'_3$, R'Si(—OR'—$)_yR'_{3-y}$, R'Si(—O—$SiR'_2$—)OR', R'—R", R'—N—CO, ($C_2H_4O$—$)_w$H, (—$C_3H_6O$—$)_w$H, (—$C_2H_4O$)$_w$—R', ($C_3H_6O$)$_w$—R', R', and w is an integer greater than one and less than 200.

The NGPs may also be functionalized to produce compositions having the formula: [NGP]—[R'-A]$_m$, where m, R' and A are as defined above. The compositions of the invention also include NGPs upon which certain cyclic compounds are adsorbed. These include compositions of matter of the formula: [NGP]—[X—$R_a]_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-$A_a]_m$, where m, a, X and A are as defined above.

The functionalized NGPs of the instant invention can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. Vol. 86, pp. 1839-1842 (1964), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets. Functionalization of the graphene-coated inorganic particles may be used as a method to introduce dopants into the electrode active material.

The following examples serve to provide the best modes of practice for the present invention and should not be construed as limiting the scope of the invention:

Example 1: Graphene Embraced Particles of Electrode Active Materials

Several types of electrode active materials (both anode and cathode active materials) in a fine powder form were investigated. These include $Co_3O_4$, Si, $LiCoO_2$, $LiMn_2O_4$, lithium iron phosphate, etc., which are used as examples to illustrate the best mode of practice. These active materials either were prepared in house or were commercially available.

In a typical experiment, 1 kg of electrode active material powder and 100 grams of natural flake graphite, 50 mesh (average particle size 0.18 mm; Asbury Carbons, Asbury N.J.) were placed in a high-energy ball mill container. The ball mill was operated at 300 rpm for 0.5 to 4 hours. The container lid was then removed and particles of the active materials were found to be fully coated (embraced or encapsulated) with a dark layer, which was verified to be graphene by Raman spectroscopy. The mass of processed material was placed over a 50 mesh sieve and, in some cases, a small amount of unprocessed flake graphite was removed.

Example 2: Functionalized Graphene-Encapsulated Sn Particles

The process of example 1 was replicated with the inclusion of 50 grams of urea as a nitrogen source. The coated powder created was functionalized graphene-encapsulated Sn particles for use as an anode active material in a lithium-ion battery. It may be noted that chemical functionalization is used to improve wettability of the electrode active material by the electrolyte or the compatibility between the electrode active material and the electrolyte in a battery.

Example 3: Graphene-Embraced $SnO_2$ Particles

In an experiment, 2 grams of 99.9% purity tin oxide powder (90 nm diameter) and 0.25 grams highly oriented pyrolytic graphite (HOPG) were placed in a resonant acoustic mill and processed for 5 minutes. For comparison, the same experiment was conducted, but the milling container further contains zirconia milling beads. We were surprised to discover that the former process (tin oxide particles serving as the milling media per se without the externally added zirconia milling beads) led to mostly single-particle particulate (each particulate contains one particle encapsulated by graphene sheets). In contrast, with the presence of externally added milling beads, a graphene-embraced particulate tends to contain multiple tin oxide particles (typically 3-50) wrapped around by graphene sheets. These same results were also observed for most of metal oxide-based electrode active materials (both anode and cathode). We have further observed that embraced single-particle particulates tend to lead to a higher specific capacity (especially under high-rate conditions) and longer cycle life.

Example 4: Graphene-Encapsulated Si Micron Particles

In a first experiment, 500 g of Si powder (particle diameter~3 µm) and 50 grams of highly oriented pyrolytic graphite (HOPG) were placed in a high-intensity ball mill. The mill was operated for 20 minutes, after which the container lid was opened and un-processed HOPG was removed by a 50 mesh sieve. The Si powder was coated with a dark layer, which was verified to be graphene by Raman spectroscopy.

In a second experiment, micron-scaled Si particles from the same batch were pre-coated with a layer of polyethylene (PE) using a micro-encapsulation method that includes preparing solution of PE dissolved in toluene, dispersing Si particles in this solution to form a slurry, and spry-drying the slurry to form PE-encapsulated Si particles. Then, 500 g of PE-encapsulated Si particles and 50 grams of HOPG were placed in a high-intensity ball mill. The mill was operated for 20 minutes, after which the container lid was opened and un-processed HOPG was removed by a 50 mesh sieve. The PE-encapsulated Si particles (PE layer varied from 0.3 to 2.0 µm) were now also embraced with graphene sheets. These graphene-embraced PE-encapsulated particles were then subjected to a heat treatment (up to 600° C.) that converted PE to carbon. The converted carbon was mostly deposited on the exterior surface of the Si particles, leaving behind a gap or pores between the Si particle surface and the encapsulating graphene shell. This gap provides room to accommodate the volume expansion of the Si particle when the lithium-ion battery is charged. Such a strategy leads to significantly improved battery cyclelife.

In a third experiment, the Si particles were subjected to electrochemical pre-lithiation to prepare several samples containing from 5% to 54% Li. Pre-lithiation of an electrode active material means the material is intercalated or loaded with lithium before a battery cell is made. Various pre-lithiated Si particles were then subjected to the presently invented graphene encapsulation treatment. The resulting graphene-encapsulated prelithiated Si particles were incorporated as an anode active material in several lithium-ion cells.

Example 5: Graphene-Embraced Ge Particles (Using Meso-Carbon Micro Beads or MCMBs as the Graphene Source)

In one example, 500 grams of B-doped Ge powder (anode active material) and 10 grams of MCMBs (China Steel Chemical Co., Taiwan) were placed in a ball mill, and processed for 3 hours. In separate experiments, un-processed MCMB was removed by sieving, air classification, and settling in a solvent solution. The graphene loading of the coated particles was estimated to be 1.4 weight %.

Example 6: Graphene Encapsulation Via Direct Transfer Vs. Chemical Production of Graphene Sheets Plus Freezer Milling A sample of graphene-embraced lithium titanate particles was prepared via the presently invented direct transfer method (using lithium titanate particles themselves as the milling media and natural graphite as the graphene source).

In a separate experiment, 10 grams of lithium titanate powder and 1 gram of reduced graphene oxide sheets (produced with the Hummer's method explained below) were placed in a freezer mill (Spex Mill, Spex Sample Prep, Metuchen N.J.) and processed for 10 minutes. In this experiment, graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove the majority of the sulphate ions. The sample was then washed repeatedly with deionized water until the pH of the filtrate was neutral. The slurry was spray-dried and placed in a vacuum oven at 60° C. for 24 hours. The interlayer spacing of the resulting laminar graphite oxide was determined by the Debey-Scherrer X-ray technique to be approximately 0.73 nm (7.3 A). A sample of this material was subsequently transferred to a furnace pre-set at 650° C. for 4 minutes for exfoliation and heated in an inert atmosphere furnace at 1200° C. for 4 hours to create a low density powder comprised of few layer reduced graphene oxide (RGO). Surface area was measured via nitrogen adsorption BET.

As discussed in the Background section, there are seven (7) major problems associated with the chemical method of graphene production. In addition, the graphene sheets, once produced, tend to result in the formation of multiple-particle particulates that each contains a plurality of electrode active material particles embraced or encapsulated by graphene sheets. They appear to be incapable of encapsulating a single particle.

Example 7: Graphene-Encapsulated Lithium Iron Phosphate (LFP) as a Cathode Active Material for a Lithium Metal Battery LFP powder, un-coated or carbon-coated, is commercially available from several sources. The carbon-coated LFP powder and un-coated LFP powder samples were separately mixed with natural graphite particles in ball mill pots of a high-intensity ball mill apparatus. The apparatus was operated for 0.5 to 4 hours for each LFP material to produce graphene-encapsulated LFP particles. In a separate set of experiments, zirconia beads were added as milling media in the same ball milling apparatus, which was operated under comparable conditions. The results again further confirm the notion that externally added milling media, such as zirconia beads, typically lead to the formation of multiple-particle particulates, rather than single-particle particulates (each particulate contains one LFP particle encapsulated by graphene sheets).

Example 8: Graphene-Encapsulated $V_2O_5$ as an Example of a Transition Metal Oxide Cathode Active Material of a Lithium Battery $V_2O_5$ powder is commercially available. A mixture of $V_2O_5$ powder and natural graphite (10/1 weight ratio) was sealed in each of 4 ball milling pots symmetrically positioned in a high-intensity ball mill. The mill was operated for 1 hour to produce particulates of graphene-encapsulated $V_2O_5$ particles, which were implemented as the cathode active material in a lithium metal battery.

Example 9: $LiCoO_2$ as an Example of Lithium Transition Metal Oxide Cathode Active Material for a Lithium-Ion Battery In a set of experiments, a mixture of $LiCoO_2$ powder and natural graphite (100/1-10/1 weight ratio) was sealed in each of 4 ball milling pots symmetrically positioned in a high-intensity ball mill. The mill was operated for 0.5-4 hours to produce particulates of graphene-encapsulated $LiCoO_2$ particles.

Example 10: Organic Material ($Li_2C_6O_6$) as a Cathode Active Material of a Lithium Metal Battery The experiments associated with this example were conducted to determine if organic materials, such as $Li_2C_6O_6$, can be encapsulated in graphene sheets using the presently invented direct transfer method. The result is that organic active materials alone are typically incapable of peeling off graphene sheets from graphite particles. However, if a second active material (i.e. rigid particles of an inorganic material or a metal oxide/phosphate/sulfide) is implemented along with an organic active material in a ball milling pot, then the organic material particles and inorganic material particles can be separately or concurrently encapsulated to form graphene-encapsulated organic particles, graphene-encapsulated inorganic particles, and graphene-encapsulated mixture of organic and inorganic particles. This is interesting and surprising.

In order to synthesize dilithium rhodizonate ($Li_2C_6O_6$), the rhodizonic acid dihydrate (species 1 in the following scheme) was used as a precursor. A basic lithium salt, $Li_2CO_3$ can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

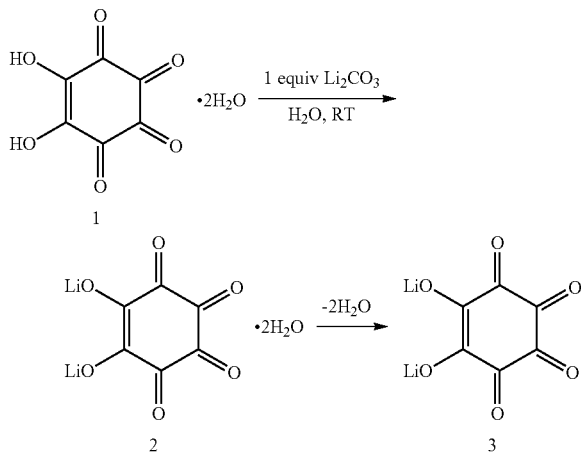

A mixture of an organic cathode active material ($Li_2C_6O_6$) and an inorganic cathode active material ($V_2O_5$ and $MoS_2$, separately) was ball-milled for 0.5-2.0 hours to obtain a mixture of graphene-encapsulated particles.

It may be noted that the two Li atoms in the formula $Li_2C_6O_6$ are part of the fixed structure and they do not participate in reversible lithium ion storing and releasing. This implies that lithium ions must come from the anode side. Hence, there must be a lithium source (e.g. lithium metal or lithium metal alloy) at the anode. In one battery cell herein tested, the anode current collector (Cu foil) is deposited with a layer of lithium (via sputtering). The resulting cell is a lithium metal cell.

Example 11: Graphene-Encapsulated $Na_3V_2(PO_4)_3$/C and $Na_3V_2(PO_4)_3$ Cathodes for Sodium Metal Batteries The $Na_3V_2(PO_4)_3$/C sample was synthesized by a solid state reaction according to the following procedure: a stoichiometric mixture of $NaH_2PO_4 \cdot 2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$. After ball milling, the mixture was heated at 900° C. for 24 h in Ar atmosphere. Separately, the $Na_3V_2(PO_4)_3$ powder was prepared in a similar manner, but without sugar. Samples of both powders were then subjected to ball milling in the presence of natural graphite particles to prepare graphene-encapsulated $Na_3V_2(PO_4)_3$ particles and graphene-encapsulated carbon-coated $Na_3V_2(PO_4)_3$ particles. The cathode active materials were used in several Na metal cells containing 1 M of $NaPF_6$ salt in PC+DOL as the electrolyte. It was discovered that graphene encapsulation significantly improved the cycle stability of all Na metal cells studied. In terms of cycle life, the following sequence was observed: graphene-encapsulated $Na_3V_2(PO_4)_3$/C>graphene-encapsulated $Na_3V_2(PO_4)_3$>$Na_3V_2(PO_4)_3$/C>$Na_3V_2(PO_4)_3$.

Example 12: Preparation of Graphene-Encapsulated $MoS_2$ Particles as a Cathode Active Material of a Na Metal Battery A wide variety of inorganic materials were investigated in this example. For instance, an ultra-thin $MoS_2$ material was synthesized by a one-step solvothermal reaction of $(NH_4)_2MoS_4$ and hydrazine in N,N-dimethylformamide (DMF) at 200° C. In a typical procedure, 22 mg of $(NH_4)_2MoS_4$ was added to 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for 5 times to ensure that most DMF was removed. Finally, $MoS_2$ particles were dried and subjected to graphene encapsulation by high-intensity ball milling in the presence of natural graphite particles.

Example 13: Preparation of Two-Dimensional (2D) Layered $Bi_2Se_3$ Chalcogenide Nanoribbons The preparation of (2D) layered $Bi_2Se_3$ chalcogenide nanoribbons is well-known in the art. In the present study, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures were subjected to graphene encapsulation using the presently invented direct transfer method. The graphene-encapsulated $Bi_2Se_3$ nanoribbons were used as a cathode active material for Na battery. Surprisingly, $Bi_2Se_3$ chalcogenide nanoribbons are capable of storing Na ions on their surfaces.

Example 14: Preparation of Graphene-Encapsulated $MnO_2$ and $NaMnO_2$ Cathode Active Material for Na Metal Cells and Zn Metal Cells For the preparation of the $MnO_2$ powder, a 0.1 mol/L $KMnO_4$ aqueous solution was prepared by dissolving potassium permanganate in deionized water. Meanwhile, 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution was added into the solution, which was ultrasonicated for 30 min to prepare a dark brown precipitate. The product was separated, washed several times with distilled water and ethanol, and dried at 80° C. for 12 h. Some amount of the $MnO_2$ powder was then subjected to the direct transfer treatment to obtain graphene-encapsulated $MnO_2$ particles.

Additionally, $NaMnO_2$ particles were synthesized by ball-milling a mixture of $Na_2CO_3$ and $MnO_2$ (at a molar ratio of 1:2) for 12 h followed by heating at 870° C. for 10 h. The resulting $NaMnO_2$ particles were then subjected to ball-milling in the presence of MCMB particles to prepare graphene encapsulated $NaMnO_2$ particles.

The $MnO_2$ particles, with or without graphene encapsulation, are also incorporated in alkaline $Zn/MnO_2$ cells. Graphene encapsulation was found to dramatically increase the cycle life of this type of cell. The Zn-graphene/$MnO_2$ battery is composed of a graphene/$MnO_2$-based cathode (with an optional cathode current collector and an optional conductive filler), a Zn metal or alloy-based anode (with an optional anode current collector), and an aqueous electrolyte (e.g. a mixture of a mild $ZnSO_4$ or $Zn(NO_3)_2$ with $MnSO_4$ in water).

Example 15: Layered Zinc Hydroxide Salts Encapsulated by Graphene Sheets as the Hybrid Cathode Material The structural arrangements of dodecyl sulfate (DS) anions in the interlayer space of layered zinc hydroxide salts (LZH-DS) and of the structure of zinc hydroxide layers were investigated. As-prepared, highly crystalline LZH-DS has a basal spacing of 31.5 Å (3.15 nm). After treatment with methanol at room temperature, zinc hydroxide layers shrank to form two new layered phases with basal spacings of 26.4 and 24.7 Å. The shrinking was accompanied by a decrease in the content of DS anions in the interlayer space, indicating a change in the alignment of the intercalated anions and a decrease in the charge density of the zinc hydroxide layers. This study indicates that tetrahedra Zn ions can be reversibly removed from the hydroxide layers, with the octahedrally coordinated Zn ions left unaffected. This result suggests that layered zinc hydroxide can be used as a Zn intercalation compound. In the present investigation, layered zinc hydroxide particles were also subjected to ball milling in the presence of natural graphite particles, resulting in the formation of graphene-encapsulated zinc hydroxide particles. It was discovered that graphene encapsulation imparts high-rate capability to the layered zinc hydroxide when used as a cathode active material of a Zn metal cell.

Example 16: Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., graphene-encapsulated Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Figure 4:
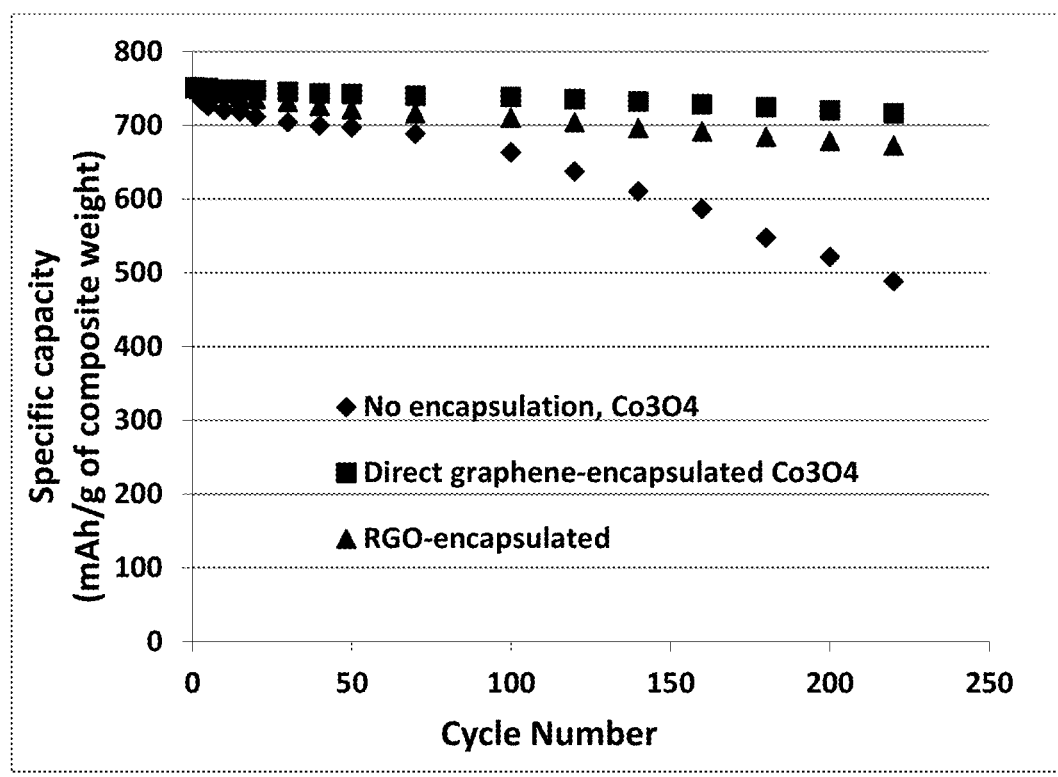
FIG. 4 Charge-discharge cycling behaviors of 3 lithium cells featuring $Co_3O_4$ particle-based anodes: a) containing un-protected $Co_3O_4$ particles, b) reduced graphene oxide (RGO)-embraced $Co_3O_4$ particles (a prior art approach), and c) graphene-encapsulated $Co_3O_4$ particles produced by the instant direct transfer method.

Shown in FIG. 4 are the charge-discharge cycling behaviors of 3 lithium cells all featuring $Co_3O_4$ particle-based anodes: (a) containing un-protected $Co_3O_4$ particles, (b) reduced graphene oxide (RGO)-embraced $Co_3O_4$ particles (a prior art approach), and (c) graphene-encapsulated $Co_3O_4$ particles produced by the instant direct transfer method. These data have clearly demonstrated the surprising result that the presently invented graphene-encapsulated $Co_3O_4$ particles, when implemented as an anode active material, deliver the very best battery cycling behavior, even better than that of a battery having RGO-embraced $Co_3O_4$ particles as the anode active material. In contrast, the battery having un-protected $Co_3O_4$ particles as the anode active material exhibit rapid capacity decay upon repeated charges and discharges.

Figure 5:
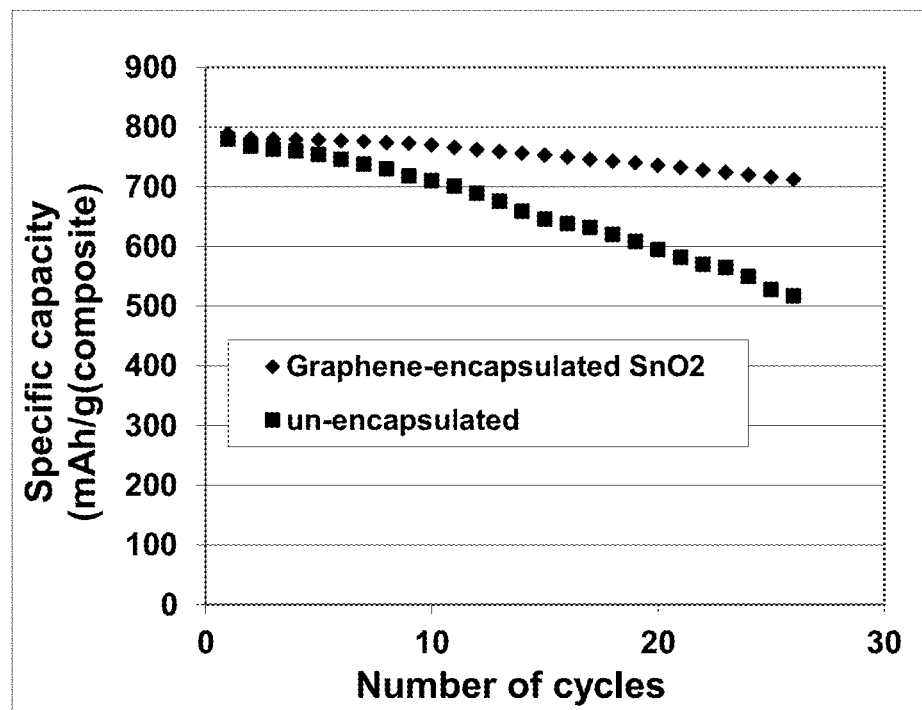
FIG. 5 Charge-discharge cycling behaviors of 2 lithium cells featuring $SnO_2$ particle-based anodes: one containing un-protected $SnO_2$ particles and the other containing graphene-encapsulated $SnO_2$ particles produced by the instant direct transfer method.

FIG. 5 shows the charge-discharge cycling behaviors of 2 lithium cells featuring $SnO_2$ particle-based anodes: one containing un-protected $SnO_2$ particles and the other containing graphene-encapsulated $SnO_2$ particles produced by the instant direct transfer method. Again, the instant method leads to a lithium battery that exhibits a significantly more stable cycling behavior.

Figure 6:
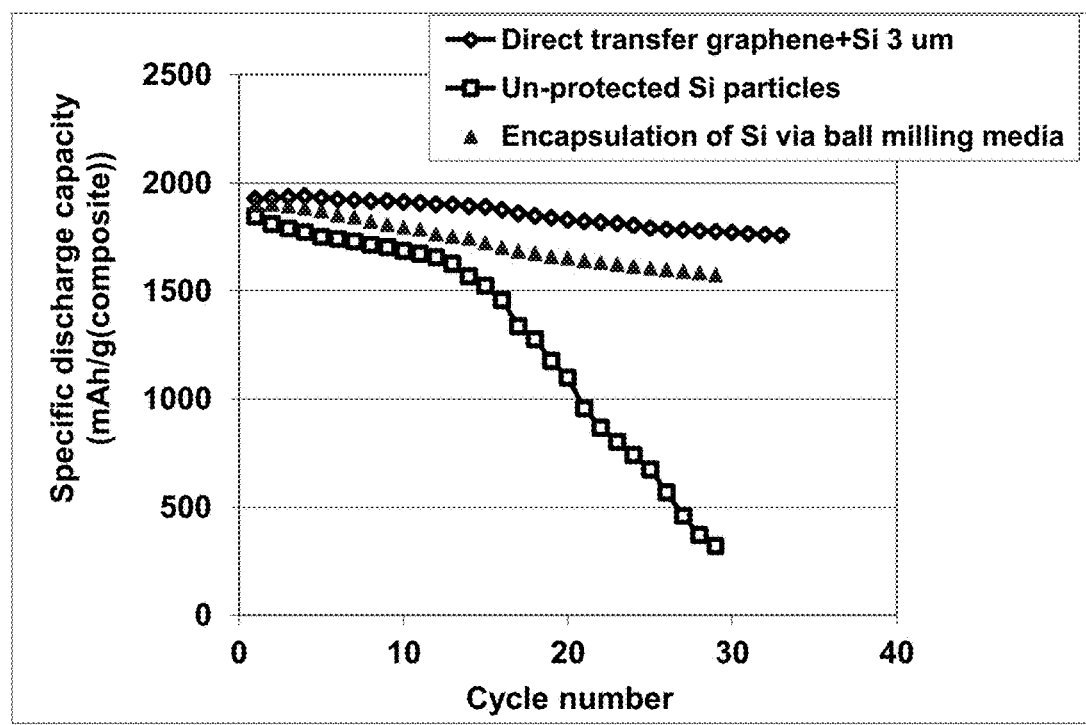
FIG. 6 Charge-discharge cycling behaviors of 3 lithium cells featuring micron-scaled (3 μm) Si particle-based anodes: a) containing un-protected Si particles, b) graphene-embraced Si particles produced by the indirect transfer method (with externally added milling media), and c) graphene-encapsulated Si particles produced by the instant direct transfer method (Si particles themselves being the graphene-peeling agent).

FIG. 6 shows the charge-discharge cycling behaviors of 3 lithium cells featuring micron-scaled (3 μm) Si particle-based anodes: a) containing un-protected Si particles, b) graphene-embraced Si particles produced by the indirect transfer method (with externally added milling media), and c) graphene-encapsulated Si particles produced by the instant direct transfer method (Si particles themselves being the graphene-peeling agent). Again, quite unexpectedly, graphene-encapsulated Si particles produced by the instant direct transfer method imparts significantly better battery cycling performance as compared to graphene-embraced Si particles produced by the indirect transfer method.

Figure 7:
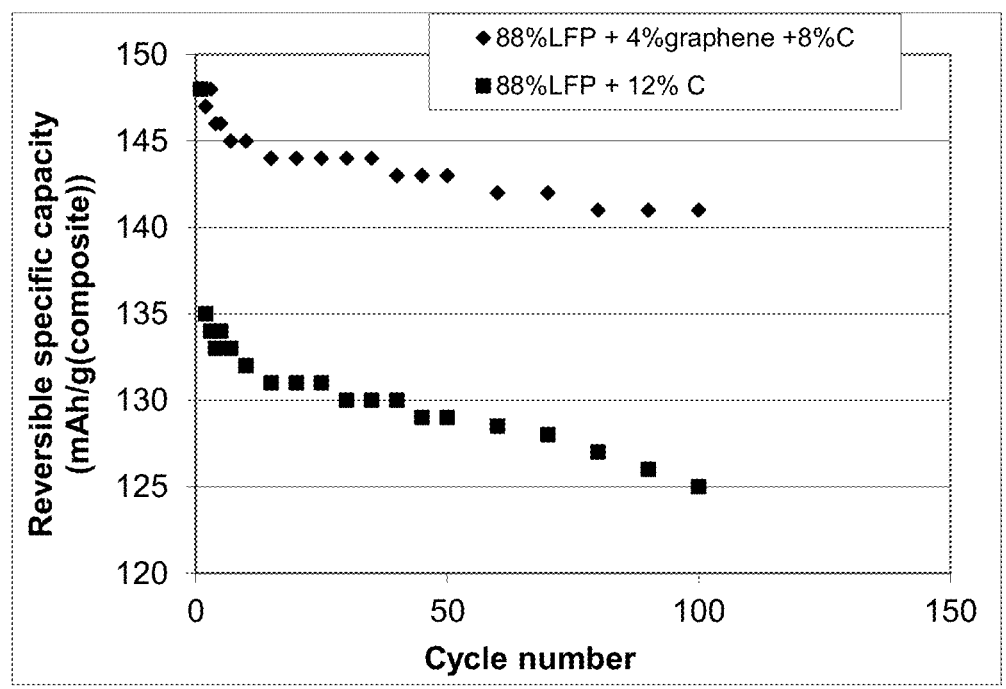
FIG. 7 Charge-discharge cycling behaviors of 2 lithium cells featuring lithium iron phosphate (LFP) particle-based cathodes: one containing un-protected LFO particles (mixed with 12% by weight carbon) and the other containing graphene-encapsulated carbon-added LFP particles produced by the instant direct transfer method (4% graphene+8% C).

FIG. 7 shows the charge-discharge cycling behaviors of 2 lithium cells featuring lithium iron phosphate (LFP) particle-based cathodes: one containing un-protected LFO particles (mixed with 12% by weight carbon) and the other containing graphene-encapsulated carbon-added LFP particles produced by the instant direct transfer method (4% graphene+8% C). The latter demonstrates a much better cycling behavior; the differences being quite dramatic.

Figure 8:
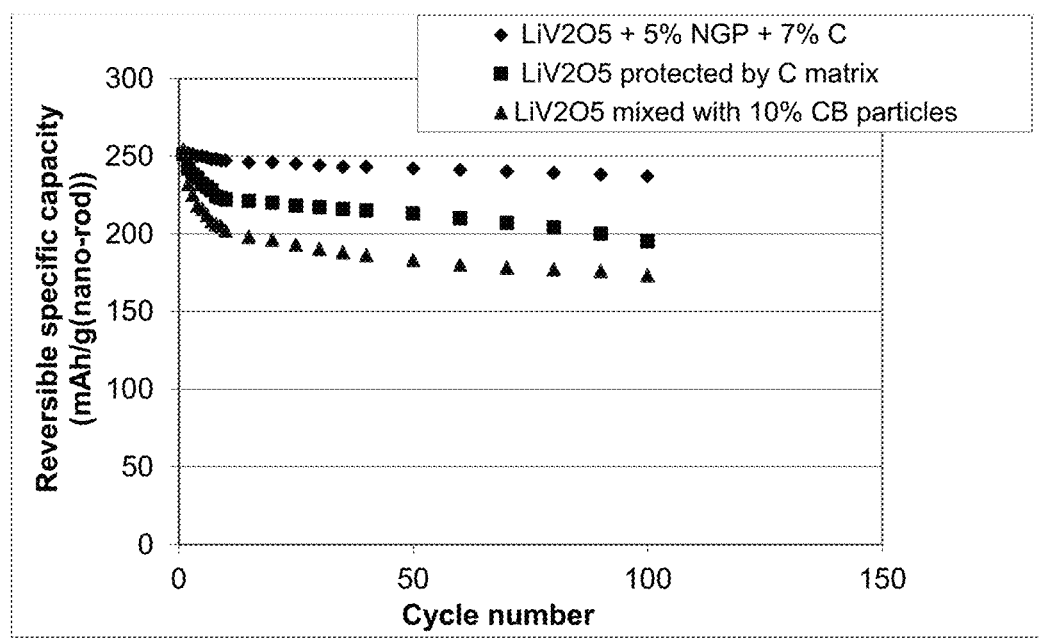
FIG. 8 Charge-discharge cycling behaviors of 3 lithium cells featuring $LiV_2O_5$ nanorod-based cathodes: a) containing un-protected $LiV_2O_5$ nanorods (mixed with 10% by weight carbon black particles, b) graphene-embraced $LiV_2O_5$ nanorods produced by the direct transfer method (approximately 5% graphene+7% C), and c) $LiV_2O_5$ nanorods protected by a carbon matrix.

FIG. 8 shows the charge-discharge cycling behaviors of 3 lithium cells featuring $LiV_2O_5$ nanorod-based cathodes: a) containing un-protected $LiV_2O_5$ nanorods (mixed with 10% by weight carbon black particles, b) graphene-embraced $LiV_2O_5$ nanorods produced by the direct transfer method (approximately 5% graphene+7% C), and c) $LiV_2O_5$ nanorods protected by a carbon matrix. These results have demonstrated that graphene-embraced $LiV_2O_5$ nanorods produced by the direct transfer method lead to the most stable battery cycling behavior.

FIGS. 4-8 are but a few examples of the massive amount of data that demonstrate the surprisingly superior cycling performances of lithium batteries featuring the presently invented graphene-encapsulated electrode active material particles. Similar results have been obtained with other types of batteries, such as other lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, lithium-ion capacitors, and sodium-ion capacitors.

The invention claimed is:

1. A direct-transfer method of producing a graphene-embraced or graphene-encapsulated electrode active material directly from a graphitic material, said method comprising:
 a) mixing multiple particles of a graphitic material and multiple particles of a solid electrode active material to form a mixture in an impacting chamber of an energy impacting apparatus, wherein said graphitic material has never been previously intercalated, oxidized, or exfoliated and said impacting chamber contains therein no previously produced isolated graphene sheets and no ball-milling media other than said multiple particles of a solid electrode active material;
 b) operating said energy impacting apparatus with a frequency and an intensity for a length of time sufficient for peeling off graphene sheets from said particles of graphitic material and transferring said peeled graphene sheets to surfaces of said solid electrode active material particles and fully embrace or encapsulate said particles to produce particles of graphene-embraced or graphene-encapsulated electrode active material inside said impacting chamber; and
 c) recovering said particles of graphene-embraced or graphene-encapsulated electrode active material from said impacting chamber.

2. The method of claim 1, further comprising a step of incorporating said graphene-embraced electrode active material into a battery electrode.

3. The method of claim 1, wherein an amount of residual graphitic material remains after said step b) and said method further comprises a step of incorporating said graphene-embraced electrode active material and said residual graphitic material into a battery electrode wherein said residual graphitic material is used as a conductive additive in said battery electrode.

4. The method of claim 1, wherein an amount of residual graphitic material remains after said step b), and said step c) includes a step of partially or completely separating said residual amount of said graphitic material from said graphene-embraced electrode active material.

5. The method of claim 1, wherein said particles of solid electrode active material contain pre-lithiated or pre-sodiated particles having 0.1% to 54.7% by weight of lithium or sodium ions preloaded into said particles prior to step (a) of mixing.

6. The method of claim 1, wherein said particles of solid electrode active material contain particles pre-coated with a layer of conductive material selected from a carbon, pitch, carbonized resin, conductive polymer, conductive organic material, metal coating, metal oxide shell, or a combination thereof.

7. The method of claim 1, wherein said particles of solid electrode active material contain particles pre-coated with a carbon precursor material prior to step (a), wherein said carbon precursor material is selected from a coal tar pitch, petroleum pitch, meso-phase pitch, polymer, organic material, or a combination thereof so that said carbon precursor material resides between surfaces of said particles of solid electrode active material and said graphene sheets, and method further contains a step of heat-treating said graphene-embraced electrode active material to convert said carbon precursor material to a carbon material and pores, wherein said pores form empty spaces between surfaces of said particles of solid electrode active material and said graphene sheets and said carbon material is coated on said surfaces of solid electrode active material particles and/or chemically bonds said graphene sheets together.

8. The method of claim 1, wherein said particles of solid electrode active material contain particles pre-coated with a sacrificial material selected from a metal, pitch, polymer, organic material, or a combination thereof so that said sacrificial material resides between surfaces of said particles of solid electrode active material and said graphene sheets, and said method further contains a step of partially or completely removing said sacrificial material to form empty spaces between surfaces of said solid electrode active material particles and said graphene sheets.

9. The method of claim 1, further comprising a step of exposing said graphene-embraced electrode active material to a liquid or vapor of a conductive material that is conductive to electrons and/or ions of lithium, sodium, magnesium, aluminum, or zinc.

10. The method of claim 1, wherein said particles of electrode active material are an anode active material selected from the group consisting of:
 (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
 (B) lithiated and un-lithiated alloys or intermetallic compounds of Si, Ge, Sn, Pb, Sb, Bi, Zn, Al, Ti, Ni, Co, or Cd with other elements;
 (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
 (D) lithiated and un-lithiated salts and hydroxides of Sn;
 (E) lithium titanate, lithium manganate, lithium aluminate, lithium-containing titanium oxide, lithium transition metal oxide;
 and combinations thereof.

11. The method of claim 1, wherein said electrode active material is a cathode active material selected from an inorganic material, an organic or polymeric material, a metal oxide/phosphate/sulfide, or a combination thereof.

12. The method of claim 11, wherein said metal oxide/phosphate/sulfide is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

13. The method of claim 1, wherein said electrode active material is a cathode active material selected from sulfur, sulfur compound, sulfur-carbon composite, sulfur-polymer composite, lithium polysulfide, transition metal dichalcogenide, a transition metal trichalcogenide, or a combination thereof.

14. The method of claim 11, wherein said inorganic material is selected from $TiS_2$, $TaS_2$, $MoS_2$, $NbSe_3$, $MnO_2$, $CoO_2$, an iron oxide, a vanadium oxide, or a combination thereof.

15. The method of claim 11, wherein said metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_8V_6O_{13}$, their doped versions, their derivatives, and combinations thereof, wherein $0.1 < x < 5$.

16. The method of claim 11, wherein said metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

17. The method of claim 11, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

18. The method of claim 11, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

19. The method of claim 18, wherein said thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di (1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio) thiophene] (PEDTT).

20. The method of claim 11, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

21. The method of claim 1, wherein said electrode active material is a cathode active material containing a mixture of an organic material and an inorganic material or a metal oxide/phosphate/sulfide.

22. The method of claim 1, wherein said electrode active material particles include powder, flakes, beads, pellets, spheres, wires, fibers, filaments, discs, ribbons, or rods, having a diameter or thickness from 10 nm to 20 µm.

23. The method of claim 22, wherein said diameter or thickness is from 1 µm to 10 µm.

24. The method of claim 1, wherein said graphitic material is selected from natural graphite, synthetic graphite, highly oriented pyrolytic graphite, graphite fiber, graphitic nano-fiber, graphite fluoride, chemically modified graphite, meso-carbon micro-bead, partially crystalline graphite, or a combination thereof.

25. The method of claim 1, wherein the energy impacting apparatus is a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer.

26. The method of claim 1 wherein said graphene sheets contain single-layer graphene sheets.

27. The method of claim 1 wherein said graphene sheets contain at least 80% single-layer graphene or at least 80% few-layer graphene having no greater than 10 graphene planes.

28. The method of claim 1, wherein said procedure of operating said energy impacting apparatus is conducted in a continuous manner using a continuous energy impacting device.

29. A mass of graphene-embraced particles of solid active material produced by the method of claim 1, wherein a graphene proportion is from 0.01% to 20% by weight based on the total weight of graphene and solid active material particles combined.

30. A battery electrode containing said graphene-embraced or graphene-encapsulated electrode active material produced in claim 1.

31. A battery containing the battery electrode of claim 30.

32. A battery electrode containing said graphene-embraced or graphene-encapsulated electrode active material produced in claim 1 as an electrode active material, wherein said battery is a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, or zinc-air battery.

\* \* \* \* \*